UNITED STATES PATENT OFFICE.

CHRISTIAN HANSEN AND ANTON WEINDEL, OF LEVERKUSEN, NEAR COLOGNE, GERMANY, ASSIGNORS TO SYNTHETIC PATENTS CO. INC., OF NEW YORK, N. Y., A CORPORATION OF NEW YORK.

PROCESS FOR PRODUCING ACETIC ACID FROM ACETYLENE.

1,128,780. Specification of Letters Patent. Patented Feb. 16, 1915.

No Drawing. Application filed January 16, 1914. Serial No. 812,428.

*To all whom it may concern:*

Be it known that we, CHRISTIAN HANSEN and ANTON WEINDEL, doctors of philosophy, chemists, citizens of the German Empire, residing at Leverkusen, near Cologne-on-the-Rhine, Germany, have invented new and useful Improvements in Processes for Producing Acetic Acid from Acetylene, of which the following is a specification.

Our invention relates to a new and valuable process for producing acetic acid from acetylene.

This process consists in treating acetylene with a solution of a per-oxidizing agent, such as hydrogen peroxid, persulfuric acid, permonosulfuric acid ($H_2SO_5$), or solutions or suspensions of their salts in the presence of mercury or mercury compounds.

In order to illustrate the new process more fully the following examples are given, the parts being by weight:

Example 1: 10.8 parts of acetylene are passed into a mixture which has to be stirred of 250 parts of sulfuric acid (20–30 per cent.), 100 parts of ammonium persulfate (95 per cent.) and 5–10 parts of mercuric oxid. The temperature is kept by cooling at about 30–40° C. Subsequently 24–25 parts of pure acetic acid can be isolated by distillation from the solution of the reaction. The mixture of the reaction can also be used for the transformation of fresh quantities of acetylene by the addition of a new quantity of persulfate without removing the acetic acid already produced.

Example 2: A stream of 10.8 parts of acetylene is passed into a suspension which has to be stirred of 116 parts of potassium persulfate (98 per cent.) and 5 to 10 parts of mercuric oxid in about 250 parts of water or dilute sulfuric acid of 10–30 per cent. The temperature of the mixture of the reaction is kept by cooling at about 30–40° C. 25 parts pure acetic acid are obtained. The oxidizing agent can also be gradually added in several portions to the mixture.

Example 3: 112 parts of hydrogen peroxid (30 per cent.) and 26 parts of acetylene are gradually added to a well cooled mixture of about 400 parts of sulfuric acid (20–30 per cent.) and 10–20 parts of mercuric oxid, while the mixture is cooled. 55–60 parts of pure acetic acid are thus obtained.

The term "per-oxidizing agent" is used in describing the present invention as generic to such percompounds as those referred to, *e. g.* hydrogen peroxid, persulfuric acid and its salts, permonosulfuric acid, etc.

Instead of the mentioned mercury compounds other ones or metallic mercury itself can be used.

We claim:—

1. Process for producing acetic acid which comprises treating acetylene with a per-oxidizing agent and with a substance containing mercury.

2. Process for producing acetic acid which comprises treating acetylene with a per-oxidizing agent and with a substance containing mercury in the presence of sulfuric acid.

3. Process for producing acetic acid which comprises treating acetylene with an acid solution of a per-oxidizing agent and with a substance containing mercury.

4. Process for producing acetic acid which comprises treating acetylene with a persulfate and with a substance containing mercury.

5. Process for producing acetic acid which comprises treating acetylene with a persulfate and with a substance containing mercury in the presence of sulfuric acid.

6. Process for producing acetic acid which comprises treating acetylene with an acid solution of a persulfate and with a substance containing mercury.

7. Process for producing acetic acid which comprises introducing acetylene into sulfuric acid containing a per-oxidizing agent and a mercury compound.

8. Process for producing acetic acid which comprises introducing acetylene into sulfuric acid containing a persulfate and a mercury compound.

9. Process for producing acetic acid which comprises introducing acetylene into sulfuric acid containing a per-oxidizing agent and a mercury compound at a temperature of about 30–40° C.

10. Process for producing acetic acid which comprises introducing acetylene into sulfuric acid containing a persulfate and a mercury compound at a temperature of about 30–40° C.

In testimony whereof we have hereunto set our hands in the presence of two subscribing witnesses.

CHRISTIAN HANSEN.
ANTON WEINDEL.

Witnesses:
HANS BRÜCKNER,
HERMANN VON KILEY.